Figure 1:
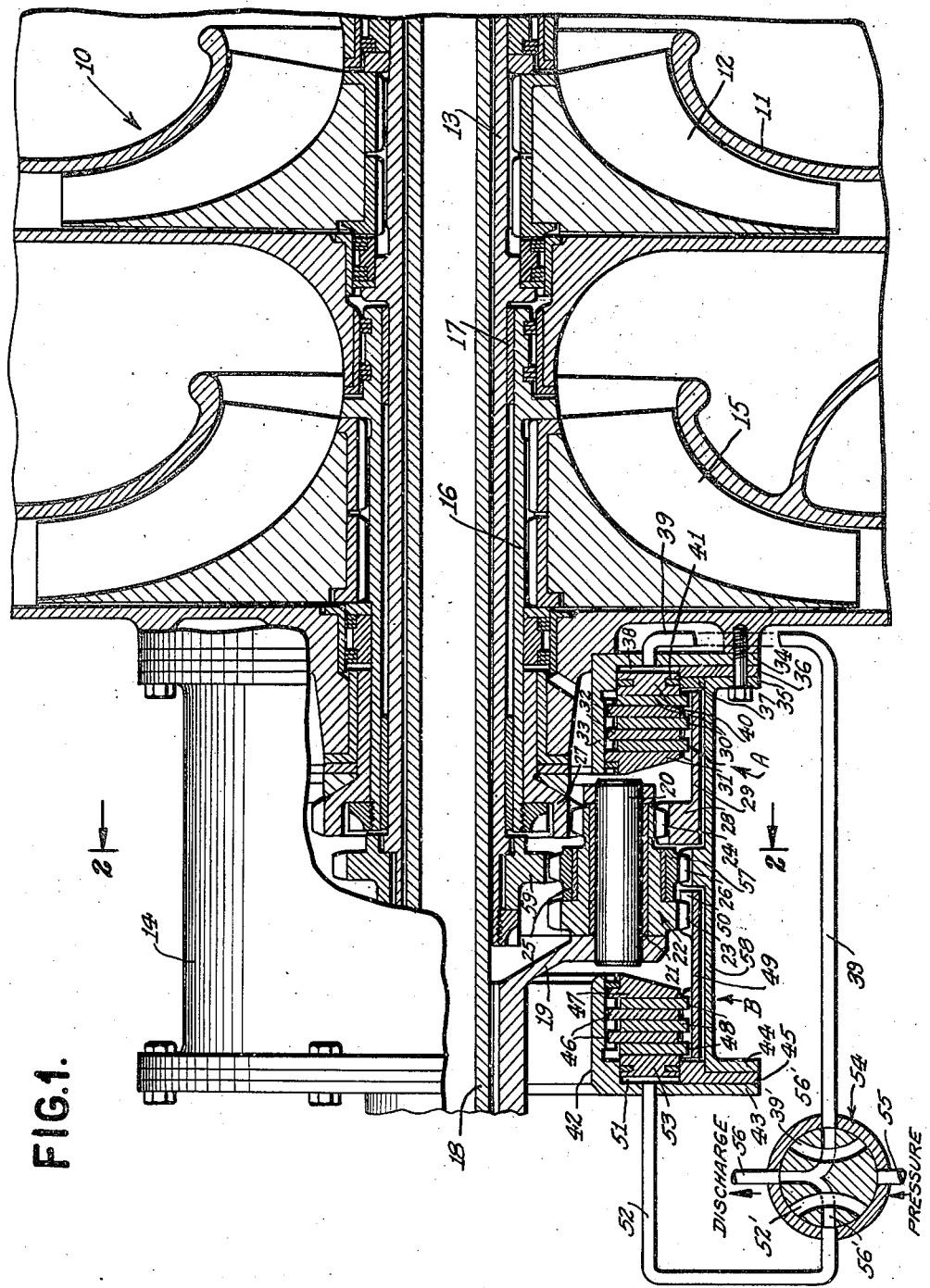

July 2, 1946.　　　　C. C. DE PEW　　　　2,402,951
SPEED CHANGE MECHANISM
Filed Aug. 20, 1942　　　2 Sheets-Sheet 1

INVENTOR
CHESTER C. DEPEW
BY Hoguet, Leary & Campbell
ATTORNEYS

July 2, 1946.                    C. C. DE PEW                    2,402,951
                          SPEED CHANGE MECHANISM
                    Filed Aug. 20, 1942            2 Sheets-Sheet 2

INVENTOR
CHESTER C. DEPEW
BY
ATTORNEYS

Patented July 2, 1946

2,402,951

UNITED STATES PATENT OFFICE 2,402,951

SPEED-CHANGE MECHANISM

Chester C. De Pew, Farmingdale, N. Y., assignor to Fairchild Engine and Airplane Corporation, Farmingdale, N. Y., a corporation of Maryland Application August 20, 1942, Serial No. 455,459

10 Claims. (Cl. 74—277)

This invention relates to speed change mechanism, and has particular reference to variable speed planetary gear type transmissions for changing the speed of the driving members for a pump or supercharger impeller, aircraft propeller, or other driven element.

In variable speed transmissions adapted particularly for aircraft use, such as those interposed between the engine and the propeller, between the engine and the impeller of a supercharger, and the like, lightness, compactness, minimum number of parts, accessibility, and, principally, reliability and speed of operation are essential. The mechanism disclosed in my copending application Serial No. 337,429, filed May 27, 1940, now Patent No. 2,293,050, dated August 18, 1943, has the aforementioned characteristics, and the present invention is an improvement on that mechanism, whereby a third driving speed is made possible by a simple change not involving material increase in the number of added parts, or drastic reconstruction of the mechanism of said patent, so that the size and weight of the mechanism is not appreciably increased.

The mechanism of said patent comprises a rotary driving member operatively connected to the power source, such as an aircraft engine or the like, and carrying a circular series of planet gears journalled in stub shafts secured thereto. Each planet gear comprises a pair of integral or connected pinions, each of different diameter, and each meshing with a corresponding ring gear selectively connectible to a fixed part by means of a stationary fluid-operated brake. One of the pinions of each planet gear meshes with a gear on the driven member, so that, by selectively engaging the corresponding brake, the fixed speed of rotation of the planet pinion is imparted to the driven member, two speeds being possible with the arrangement described.

The above described mechanism is modified in accordance with the present invention to provide a third speed for an impeller or other driven member, and the modification consists primarily in journalling on each double planet gear a third or auxiliary pinion, which is independent of the other two pinions of the planet gear on which it is journalled, and engages a stationary ring gear and a separate sun gear connected to a separate shaft for driving a member such as primary supercharger impeller, independently of the auxiliary stage impeller driven at either of two speeds by the double planet gear, as described.

Simple disc brakes surrounding the driven member coaxially with the planet gears, actuated by fluid-operated cylinders enable the control of two speeds and neutral for the auxiliary stage impeller, while the primary impeller is driven constantly at predetermined speed by the auxiliary pinions arranged as described.

It will be seen that a very compact cylindrically-shaped transmission for procuring at will any one of these speeds and neutral, which is instantly operable by means of the control valve conveniently located in the cockpit for controlling fluid pressure from a readily available source, such as that otherwise utilized for adjusting the pitch of the propeller, operating landing gear, and the like.

Figure 2:
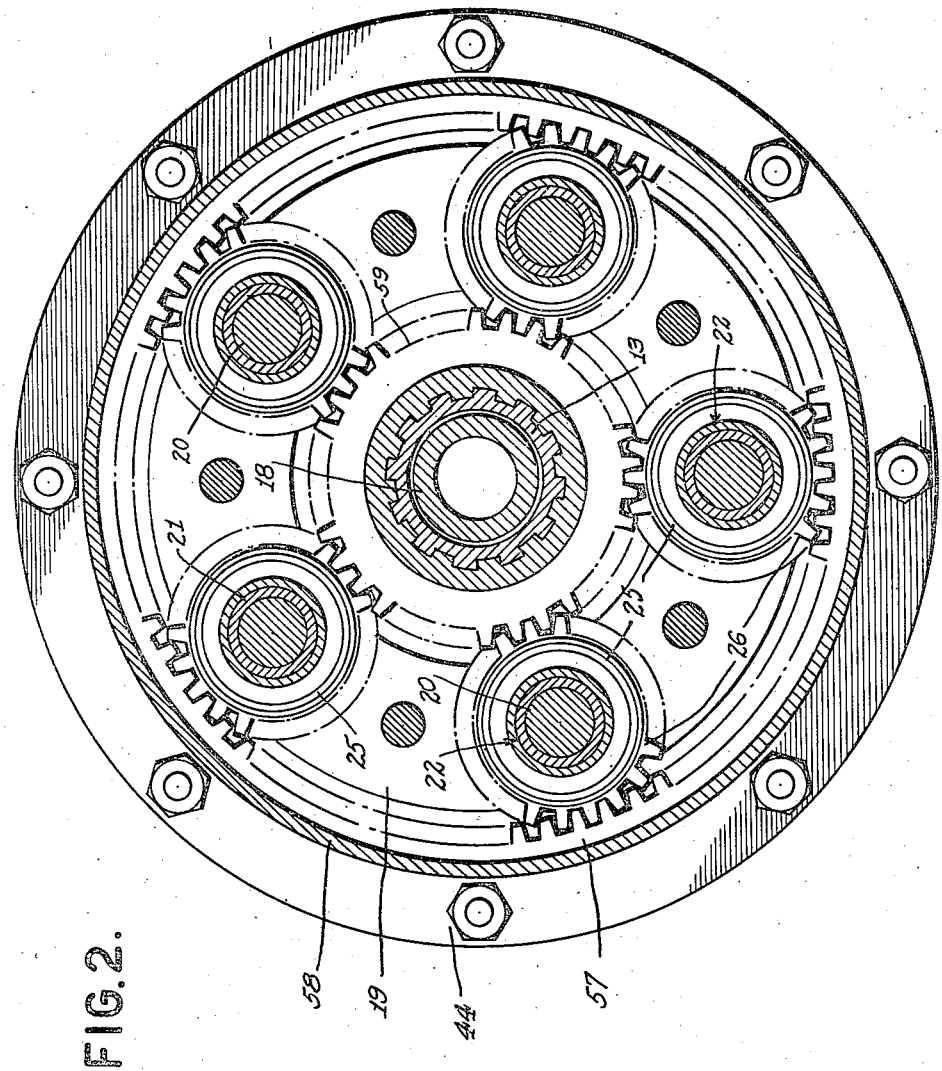

For a more complete understanding of the invention, reference may be had to the accompanying drawings, in which:

Figure 1 is an axial section through the speed change mechanism of this invention, and shows one mode of its application to a multistage supercharger; and Fig. 2 is a transverse section therethrough as seen along the line 2—2 of Fig. 1;

Referring to Fig. 1 of the drawings, illustrating by way of example, the application of the invention to a two stage aeroplane engine supercharger 10, having the usual intake scroll, not shown, leading to the primary or main stage comprising the housing 11 for the primary impeller 12 keyed on tubular drive shaft 13. Shaft 13 extends through the casing of supercharger 10 and serves as one driven member for the speed change mechanism of this invention which is contained in the cylindrical housing 14, suitably secured to the casing of supercharger 10 coaxially with the driven member 13 connected to primary impeller 12. Interposed between the primary impeller housing 11 and the speed change mechanism housing 14 is the auxiliary stage impeller 15 keyed to tubular shaft 16 telescoped over shaft 13 on suitable bearings 17 and likewise leading into housing 14.

The driving member or shaft 18, geared or otherwise connected to the engine or other power source, not shown, extends through tubular shaft or driven member 13 and projects beyond both ends thereof, as shown.

Keyed on one end of the driving member 18 so as to rotate therewith is a disc or spider 19 positioned within housing 14 and having a circular series of stub shafts 20 projecting therefrom parallel to the axis of driving member 18. In the construction illustrated, particularly in Fig. 2, five of such stub shafts 20 are provided, although more or less may be utilized, depending on requirements.

Journalled on each stub shaft 20, over a suitable bushing 21, is a planet gear 22. Each planet gear 22 comprises two integral pinions of different diameters, the larger pinion being designated 23 and the smaller pinion 24. These pinions 23 and 24 are spaced apart to form a hub on which is journalled over bushing 25, a third pinion 26, which being free of planet gear 22, rotates independently thereon.

Referring first to the integral pinions of each planet gear 22, the small pinion 24 meshes with a gear 27 secured on the end of the driven member 16 for driving the same and connected auxiliary stage impeller 15 when the transmission is in operation, and rotating around gear 27 when the transmission idles. Each small pinion 24 also meshes with an internal ring gear 28 on drum 29, carrying at its other end three parallel brake plates 30, which are non-rotatably splined thereto so as to permit limited axial movement thereof.

Brake plates 30 are interposed between fixed abutment plate 31 and splined non-rotatable brake plates 32 on the tubular inner flange 33 of the base plate 34 clamped between the casing of supercharger 10 and the flange 35 of the housing 14, over a combination spacer and sealing gasket 36. Drum 29 with its brake plates 30 may rotate relatively to fixed brake plates 31 and 32. It will be understood that the engaging brake plates 30, 31 and 32 may be surfaced with friction material.

Formed between tubular inner flange 33, a flange 37 projecting from the inner wall of housing 14 and base plate 34 is an annular chamber 38, which serves as a pressure cylinder supplied with fluid under pressure, such as oil, by means of pipe 39. The inner surfaces of flanges 33 and 37 are accurately machined to form two parallel cylindrical surfaces between which the annular piston 40 is slidably mounted for axial movement. Sealing ring 41 in piston 40 seals the piston 40 fluid-tightly in its cylinder 38. It will be observed that piston 40 acts as a presser plate for the corresponding brake, which is designated A.

A similar brake, designated B, is positioned in the opposite end of housing 14, being carried by a stationary sleeve 42 integral with the end plate 43 of the housing 14, which is secured to a flange 44 thereof over a spacer 45. The non-rotating brake plates 46 and 47 are mounted on sleeve 42, plates 46 being splined thereon for limited axial movement. Interposed between these fixed brake plates 46 and 47 are the cooperating brake plates 48 non-rotatably splined on the inner surface of drum 49 aligned with drum 29 of brake A. The inner surface of drum 49 is provided with an internal ring gear 50, with which the large integral pinions 23 of planet gears 22 mesh. Drum 49 with its clutch plates 48 may rotate relatively to fixed brake plates 46 and 47.

An annular pressure cylinder 51, supplied with fluid under pressure from pipe 52 is formed between sleeve 42 housing end plate 43 and spacer 45, and contains an annular piston 53, which acts as a presser plate for brake B and is constructed and functions like piston 40 of brake A.

The respective actuating cylinders 38 and 51 of brakes A and B are connected by the corresponding pipes 39 and 52 to a three-way valve 54 located in the cockpit, or the like, and suitably actuated, as by a handle, for connecting either pipe 39 or 52 to pressure pipe 55 supplying fluid under pressure from a suitable source, not shown, and simultaneously connecting the other pipe to discharge 56 to release the pressure on the corresponding brake, A or B. When valve 54 is in the neutral position shown, both cylinders 31 and 51 discharge and the mechanism described and shaft 16 and auxiliary impeller 15 idle.

The third or free pinions 26 of each of the planet gears 22 mesh with stationary internal gear 57 formed on or fixed to the interior surface of the cylindrical housing 14. Accordingly, as the spider 19 rotates the free pinions 26 carried thereby rotate around the corresponding planet gears 22, but independently of the rotation thereof, by reason of the engagement of these free pinions 26 with stationary ring gear 57. Free pinions 26 also mesh with gear 59 keyed on tubular shaft 13 connected to primary impeller 12.

In operation of the transmission of this invention, and assuming that low speed operation for auxiliary impeller 15 is desired, the control valve 54 is rotated to low speed position, thus connecting the high pressure source 55 through valve passage 39' to pipe 39 leading to cylinder 38 of brake A. The fluid pressure supplied to cylinder 38 causes piston 40 to urge the brake plates 30, 31 and 32 into braking engagement, thus holding drum 29 and ring gear 28 stationary. Accordingly, as driving disc or spider 19 rotates, the small pinions 24 of planet gears 22 drive the driven member 16 and auxiliary impeller 15 directly, since these small pinions 24 are interposed between gear 28 on drum 29 and gear 27 on shaft 16. Meanwhile, brake B being disengaged, large integral pinions 23 of planet gears 22 perform no driving function.

For high speed operation of auxiliary impeller 15, valve 54 is rotated to high speed position, which results in disconnection of pipe 39 from pressure pipe 55 and connection thereof to discharge pipe 56 through passage 39', so that brake A is disengaged. At the same time pipe 52 is connected to pressure pipe 55, through valve passage 52', thereby supplying pressure to cylinder 51, causing piston 53 to engage brake B. Although disc or spider 19 rotates at the same speed as before, driven shaft 16 and connected auxiliary impeller 15 are driven at higher speed, for the reason that the peripheral speed of each integral large pinion 23 of planet gear 22, as it rolls around large diameter fixed ring gear 50, is higher than that of small integral pinion 24, due to the compound epicyclic gear train, as will be readily understood.

When the control valve 54 is rotated to neutral position, as shown, both pipes 39 and 52 are connected to discharge pipe 56 through valve passages 56', which are not connected to passages 39' or 52', so that both brakes A and B are in disengaged position, and the integral pinions 23 and 24 of planet gears simply rotate idly as disc or spider 19 rotates, without transmitting movement to shaft 16 and auxiliary impeller 15. However, whether or not either of brakes A or B is engaged, or both are disengaged, primary impeller 12 is driven constantly at predetermined speed, when the transmission is in operation, i. e., whenever disc or spider 19 is driven, because the free pinions 26 rotate independently of the corresponding planet gears 22 on which they are journalled, and drive primary impeller shaft 13 through its connected gear 59 with which they mesh.

Accordingly, two speeds and neutral for the auxiliary stage impeller 15, and a third speed for the primary stage impeller 12 are obtainable with this invention from a unitary normally two speed transmission, whereby a multistage supercharger or the like may be operated to obtain the corresponding thermodynamic advantages from the engine, with the same facility, all without material increase in the size and weight of the transmission.

While a preferred embodiment of the invention has been illustrated and described herein, it is to be understood that the invention is not limited thereby, but is susceptible of changes in form and detail within the scope of the appended claims.

I claim:

1. In speed change mechanism, the combination of a driving means, a driven means, planet gears carried by one of said means, each of said gears comprising at least two relatively rotatable pinions, driving connections between both sets of pinions and the other of said means, said last named means comprising two members, a fixed ring gear meshing with one set of said pinions, a rotatable ring gear meshing with another set of pinions, means for holding said rotatable ring gear stationary, said holding means including a brake element on said ring gear and a fixed brake element, and means for actuating said brake elements to operatively connect the corresponding set of planet gear pinions between the driving and driven means.

2. In speed change mechanism, the combination of a driving member, a pair of driven members, planet gears carried by said driving member, each of said gears comprising at least two relatively rotatable pinions of different diameters, a direct connection between only the pinions of one set and one of said driven members, a ring gear meshing with one set of pinions, a drum carrying said ring gear and arranged for rotation coaxially with said members, a brake element on said drum, a fixed brake element arranged for cooperation with said drum brake element, and means for actuating said brake elements to effect driving relation between said driving and said one driven member through said directly connected pinions.

3. In speed change mechanism, the combination of a driving member, a pair of driven members, planet gears carried by said driving member, each of said gears comprising at least two relatively rotatable pinions, driving connections between each set of pinions and the corresponding driven member, a ring gear meshing with one set of pinions, a brake element carried by said ring gear, a stationary brake element for cooperating with said ring gear brake element, a presser plate for engaging said brake element and holding the ring gear stationary, and means for actuating said presser plate to operatively connect the corresponding set of planet pinions between said driving and driven members.

4. In a speed change mechanism, the combination of a driving member, a pair of driven members, a plurality of planet gears supported by said driving member for bodily rotation therewith, each of said gears comprising a pair of relatively non-rotatable pinions of different diameter and a third pinion rotatable relatively to said pair of pinions, a pair of relatively rotatable drums disposed coaxially with said members, a ring gear on each of said drums, each ring gear meshing with all of the same diameter relatively non-rotatable pinions, a driving connection between one of the sets of relatively non-rotatable pinions of the same diameter and one of said driven members, a driving connection between the set of third pinions and said other driven member for driving the same, a brake element slidable on each of said drums and rotatable therewith, stationary brake elements disposed for cooperation with the brake elements on said drums, pressure members movable to engage the slidable brake elements and force the latter into engagement with the stationary brake elements to thereby hold said ring gears against rotation, means for selectively moving said pressure members to hold or release the corresponding ring gear, whereby one of said one driven members is driven at different speeds and said other driven member is driven at one speed.

5. In a speed change mechanism, the combination of a driving member, a pair of driven members, a plurality of planet gears supported by said driving member for bodily rotation therewith, each of said gears comprising a pair of relatively non-rotatable pinions of different diameter and a third pinion rotatable relatively to said pair of pinions, a pair of relatively rotatable drums disposed coaxially with said members, a ring gear on each of said drums, each ring gear meshing with all of the same diameter relatively non-rotatable pinions, a driving connection between one of the sets of relatively non-rotatable pinions of the same diameter and one of said driven members, a driving connection between the set of third pinions and said other driven member for driving the same, a fixed ring gear engaging the pinions of said third set and around which they rotate bodily, a brake element slidable on each of said drums and rotatable therewith, stationary brake elements disposed for cooperation with the brake elements on said drums, pressure members movable to engage the slidable brake elements and force the latter into engagement with the stationary brake elements to thereby hold said ring gears against rotation, means for selectively moving said pressure members to hold or release the corresponding ring gear, whereby one of said one driven members is driven at different speeds and said other driven member is driven at one speed.

6. In speed change mechanism, the combination of a driving member, a pair of driven members axially aligned therewith, a plurality of planet gears carried by said driving member for bodily rotation thereby, each of said gears comprising a plurality of relatively non-rotatable pinions of different diameters and a relatively rotatable pinion, driving connections between one of said non-rotatable pinions and one said driven members, driving connections between said rotatble pinion and the other of said driven members, a ring gear meshing with each of the same diameter non-rotatable pinions, a brake element disposed and rotatable with each ring gear, a non-rotatable brake element cooperating with each ring gear brake and pressure means to selectively actuate said brake elements for controlling the engagement and disengagement thereof to operatively connect the relatively non-rotatable planet pinion combination between said driving member and said one driven member.

7. In speed change mechanism, the combination of a driving member, a pair of driven members axially aligned therewith, a plurality of planet gears carried by said driving member for bodily rotation thereby, each of said gears comprising a plurality of relatively non-rotatable pinions of different diameters and a relatively rotatable pinion, driving connections between one of said non-rotatable pinions and one of said driven members, driving connections between said rotatable pinion and the other of said driven members, a ring gear meshing with each of the same diameter non-rotatable pinions, a brake element disposed and rotatable with each ring gear, a non-rotatable brake element cooperating with each ring gear brake, and pressure means for actuating either of said sets of brake elements to prevent rotation selectively of one only of each of said rotatable ring gears and to release both of said sets of brake elements to allow rotation of both of said rotatable ring gears.

8. In speed change mechanism, the combination of a driving member, a pair of driven members axially aligned therewith, a plurality of planet gears carried by said driving member for bodily rotation thereby, each of said gears comprising a plurality of relatively non-rotatable pinions of different diameters and a relatively rotatable pinion, driving connections between one of said non-rotatable pinions and one of said driven members, driving connections between said rotatable pinion and the other of said driven members, a fixed ring gear engaging the said relatively rotatable pinions and around which they rotate bodily, a ring gear meshing with each of the same diameter non-rotatable pinions, a brake element disposed and rotatable with each ring gear, a non-rotatable brake element cooperating with each ring gear brake, and pressure means for actuating either of said sets of brake elements to prevent rotation selectively of one only of each of said rotatable ring gears and to release both of said sets of brake elements to allow rotation of both of said rotatable ring gears.

9. In a speed change mechanism, the combination of a stationary housing, a driving and two driven members rotatably mounted in and extending axially of said housing, a plurality of planet gears supported by said driving member for bodily rotation therewith, each of said gears comprising a pair of relatively non-rotatable pinions of different diameter, and a relatively rotatable pinion journalled thereon, a pair of drums disposed coaxially with said members within said housing, an internal ring gear on each of said drums, each ring gear meshing with all of the relatively non-rotatable pinions having the same diameter, a driving connection between one of the sets of relatively non-rotatable pinions of the same diameter and one of said driven members, a driving connection between the relatively rotatable pinions and said driving member, a brake element on each of said drums and rotatable therewith, brake elements fixed on said housing for cooperation with the brake elements on said drums, a cylinder adjacent each of said drums, pistons in said cylinders movable to engage the brake elements on said drums and said housing to thereby hold the corresponding ring gears against rotation, a source of fluid pressure, and means for selectively connecting the source of fluid pressure to each of said cylinders for holding the corresponding ring gear and for simultaneously disconnecting the source of fluid pressure from both of said cylinders to release both ring gears.

10. In a speed change mechanism, the combination of a stationary housing, a driving and two driven members rotatably mounted in and extending axially of said housing, a plurality of planet gears supported by said driving member for bodily rotation therewith, each of said gears comprising a pair of relatively non-rotatable pinions of different diameter, and a relatively rotatable pinion journalled thereon, a pair of drums disposed coaxially with said members within said housing, an internal ring gear on each of said drums, each ring gear meshing with all of the relatively non-rotatable pinions having the same diameter, a driving connection between one of the sets of relatively non-rotatable pinions of the same diameter and one of said driven members, a driving connection between the relatively rotatable pinions and said driving member, a fixed gear on the housing engaging said relatively rotatable pinions, a brake element on each of said drums and rotatable therewith, brake elements fixed on said housing for cooperation with the brake elements on said drums, a cylinder adjacent each of said drums, pistons in said cylinders movable to engage the brake elements on said drums and said housing to thereby hold the corresponding ring gears against rotation, a source of fluid pressure, and means for selectively connecting the source of fluid pressure to each of said cylinders for holding the corresponding ring gear and for simultaneously disconnecting the source of fluid pressure from both of said cylinders to release both ring gears.

CHESTER C. DE PEW.